United States Patent
Agarwal et al.

(10) Patent No.: US 8,560,493 B2
(45) Date of Patent: Oct. 15, 2013

(54) DETERMINING AND/OR USING END USER LOCAL TIME INFORMATION IN AN AD SYSTEM

(75) Inventors: Sumit Agarwal, San Carlos, CA (US); Ross Koningstein, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 1676 days.

(21) Appl. No.: 10/676,369

(22) Filed: Oct. 1, 2003

(65) Prior Publication Data

US 2005/0076014 A1    Apr. 7, 2005

(51) Int. Cl.
*G06F 7/00*    (2006.01)
*G06F 17/30*    (2006.01)
*G06Q 30/00*    (2012.01)

(52) U.S. Cl.
USPC ....... 707/3; 705/14.49; 705/14.58; 705/14.66

(58) Field of Classification Search
USPC ..................................... 705/1–28
See application file for complete search history.

(56) References Cited

U.S. PATENT DOCUMENTS

| | | | |
|---|---|---|---|
| 5,948,061 A | 9/1999 | Merriman et al. | |
| 6,332,127 B1 * | 12/2001 | Bandera et al. | 705/14.55 |
| 6,343,317 B1 | 1/2002 | Glorikian | |
| 6,385,592 B1 | 5/2002 | Angles et al. | |
| 6,587,835 B1 | 7/2003 | Treyz et al. | |
| 6,591,248 B1 | 7/2003 | Nakamura et al. | |
| 6,625,456 B1 | 9/2003 | Busso et al. | |
| 6,668,353 B1 * | 12/2003 | Yurkovic | 715/205 |
| 6,711,474 B1 | 3/2004 | Treyz et al. | |
| 6,757,661 B1 * | 6/2004 | Blaser et al. | 705/14.54 |
| 2002/0022488 A1 | 2/2002 | Srinivasan et al. | |
| 2002/0044067 A1 | 4/2002 | Ilcisin | |
| 2002/0099605 A1 * | 7/2002 | Weitzman et al. | 705/14 |
| 2002/0161633 A1 * | 10/2002 | Jacob et al. | 705/14 |
| 2003/0216930 A1 * | 11/2003 | Dunham et al. | 705/1 |
| 2004/0225566 A1 * | 11/2004 | Beyda et al. | 705/14 |
| 2005/0050097 A1 * | 3/2005 | Yeh et al. | 707/104.1 |

FOREIGN PATENT DOCUMENTS

| | | |
|---|---|---|
| EP | 1 083 504 | 3/2001 |
| EP | 1083504 | 3/2001 |
| JP | 2000-163477 | 6/2000 |

OTHER PUBLICATIONS

EPO Form 1507.4, "Communication" for European Patent Application No. E04 78 9113.0, mailed Jan. 16, 2007 (1 pg.).

EPO Form 1503, "Supplementary European Search Report" for European Patent Application No. 04 78 9113.0, mailed Jan. 16, 2007 (1 pg.).

(Continued)

*Primary Examiner* — William A Brandenburg
(74) *Attorney, Agent, or Firm* — Fish & Richardson P.C.

(57) ABSTRACT

The usefulness, and consequently the performance, of advertisements are improved by allowing advertisers to better target their ads to a responsive audience. For example, end user local time information may be used in a relevancy determination of an ad. As another example, end user local time information may be used in an attribute (e.g., position) arbitration. Such end user local time information may be associated with price information, such as a maximum price bid. Such end user local time information may be associated with ad performance information. Ad performance information may be tracked on the basis of end user local time information. The content of an ad creative, and/or of a landing page may be selected and/or modified using end user local time information.

15 Claims, 9 Drawing Sheets

(56) References Cited

OTHER PUBLICATIONS

EPO Form P0459, "Annex to the European Search Report on European Patent Application No. EP 04 78 9113", mailed Jan. 16, 2007 (1 pg.).

English translation of Examination Report mailed Mar. 31, 2009, for corresponding Japanese Application No. 2006-534004.
Communication from counterpart European Application No. 04 789 113.0-1238, dated Jan. 26, 2011.
Canadian Office Action in Canadian Application No. 2,540,821, dated Mar. 26, 2013, 4 pages.

* cited by examiner

320'

330'

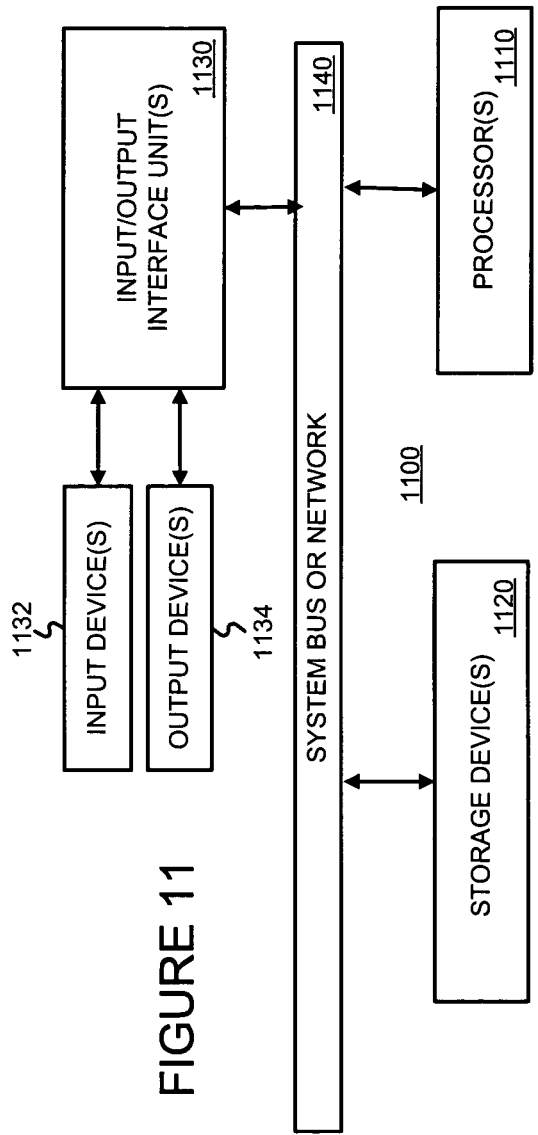

DETERMINING AND/OR USING END USER LOCAL TIME INFORMATION IN AN AD SYSTEM

1. BACKGROUND OF THE INVENTION

1. Field of the Invention

The present invention concerns advertising. In particular, the present invention concerns improving advertising using end user local time information, such as local time-of-day, local day-of-week, local date, and/or local season information (referred to generally as "time information" in the specification without loss of generality).

2. Related Art

Advertising using traditional media, such as television, radio, newspapers and magazines, is well known. Unfortunately, even when armed with demographic and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Websites" in the specification without loss of generality) as conduits to reach a large audience. Using this first approach, an advertiser may place ads on the home page of the New York Times Website, or the USA Today Website, for example. In another strategy, an advertiser may attempt to target its ads to narrower niche audiences, thereby increasing the likelihood of a positive response by the audience. For example, an agency promoting tourism in the Costa Rican rainforest might place ads on the ecotourism-travel subdirectory of the Yahoo Website. An advertiser will normally determine such targeting manually.

Regardless of the strategy, Website-based ads (also referred to as "Web ads") are often presented to their advertising audience in the form of "banner ads"—i.e., a rectangular box that includes graphic components. When a member of the advertising audience (referred to as a "viewer" or "user" in the Specification without loss of generality) selects one of these banner ads by clicking on it, embedded hypertext links typically direct the viewer to the advertiser's Website. This process, wherein the viewer selects an ad, is commonly referred to as a "click-through" ("Click-through" is intended to cover any user selection). The ratio of the number of click-throughs to the number of impressions of the ad (i.e., the number of times an ad is displayed or otherwise rendered) is commonly referred to as the "click-through rate" or "CTR" of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, etc. Often, if user actions don't indicate a consummated purchase, they may indicate a sales lead, although user actions constituting a conversion are not limited to this. Indeed, many other definitions of what constitutes a conversion are possible. The ratio of the number of conversions to the number of impressions of the ad (i.e., the number of times an ad is displayed or otherwise rendered) is commonly referred to as the conversion rate. If a conversion is defined to be able to occur within a predetermined time since the serving of an ad, one possible definition of the conversion rate might only consider ads that have been served more than the predetermined time in the past.

The hosts of Websites on which the ads are presented (referred to as "Website hosts" or "ad consumers") have the challenge of maximizing ad revenue without impairing their users' experience. Some Website hosts have chosen to place advertising revenues over the interests of users. One such Website is "Overture.com," which hosts a so-called "search engine" service returning advertisements masquerading as "search results" in response to user queries. The Overture.com Website permits advertisers to pay to position an ad for their Website (or a target Website) higher up on the list of purported search results. If such schemes where the advertiser only pays if a user clicks on the ad (i.e., cost-per-click) are implemented, the advertiser lacks incentive to target their ads effectively, since a poorly targeted ad will not be clicked and therefore will not require payment. Consequently, high cost-per-click ads show up near or at the top, but do not necessarily translate into real revenue for the ad publisher because viewers don't click on them. Furthermore, ads that viewers would click on are further down the list, or not on the list at all, and so relevancy of ads is compromised.

Search engines, such as Google for example, have enabled advertisers to target their ads so that they will be rendered in conjunction with a search results page responsive to a query that is relevant, presumably, to the ad. Although search result pages afford advertisers a great opportunity to target their ads to a more receptive audience, search result pages are merely a fraction of page views of the World Wide Web.

Some online advertising systems may use ad relevance information and document content relevance information (e.g., concepts or topics, feature vectors, etc.) to "match" ads to (and/or to score ads with respect to) a document including content, such as a Web page for example.

The foregoing ad serving systems can be thought of as keyword-targeted systems (where ads are targeted using terms found in a search query) and content-targeted systems (where ads are targeted using content of a document). Although keyword-targeted and content-targeted ad systems have improved the usefulness of ads, and consequently their performance (e.g., in terms of click-through rate, conversion rate, etc.), there is still plenty of room for improvement. Such improvement can be expected with better targeting.

Some ad servers (e.g., bid management tools) allow advertisers to specify time of day ad targeting. This offers some improvement in ad targeting. Unfortunately, however, time-of-day ad targeting techniques use a fixed time zone in their ad serving determination. Even if such businesses have ads that are relevant to a search query or a Web page, if the end user viewing a search results Web page or the content of a Web page is outside a preferred temporal window, the ads may not be very useful and may not perform well.

Consider, for example, a nationwide courier service that offers package pickup until midnight for next day delivery, while most of their competitors only offer package pickup until 8:00 PM, local time. If such a nationwide courier service wants to advertise on the Internet, the value to them of serving their ads from 7:30 PM to 11:55 PM (or some other time range corresponding to a time when users will not be able to meet an 8:00 PM pickup deadline, but should be able to meet a 12 midnight pickup deadline) might be higher than the value of serving their ads from 9:00 AM to 7:29 PM (because they have less competition after 8:00 PM and customers are likely to use their services that day). However, the value to the courier of serving its ads after 12:00 midnight might drop precipitously since the courier can no longer differentiate its services from its competitors for an end user that needs something to be delivered that day. Note in this example that the value of serving the ads depends on the time for the end user to which the ad will be rendered. For example, an ad touting pickup until midnight may have little value for a user on the east coast at 1:30 AM, but great value for a user on the west coast at 10:30 PM. If, however, the time-of-day is determined merely using a fixed time zone, this great difference in value cannot be used in ad serving.

As another example, advertisers may want to apply audience demographics which are relevant only if the local time of the audience is known. For example, an advertiser may want to increase the score of their ad during lunchtime on weekdays if demographic studies indicate that many people use the Internet to look for personal items during their lunchtime. Suppose an ad server (or a bid manager) is located in the Mountain time zone. At 10:30 AM Mountain time, it is only 9:30 AM Pacific time, but 12:30 PM Eastern time. Thus, at 10:30 AM Mountain time, the advertiser may want to increase the score of its ad for an end user on the east coast, but not for an end user on the west coast.

In view of the foregoing, there is a need for improving the usefulness, and consequently the performance, of advertisements. In particular, there is a need to allow businesses to better target their ads to a responsive audience.

2. SUMMARY OF THE INVENTION

The present invention improves the usefulness, and consequently the performance, of advertisements. The present invention allows businesses to better target their ads to a responsive audience. The present invention may do so by determining and using end user local time information.

The present invention may use end user local time information when determining a relevancy score of an ad.

Alternatively, or in addition, the present invention may use end user local time information in an attribute (e.g., position) arbitration. Such end user local time information may be associated with price information, such as a maximum price the advertiser is willing to pay for a specified result (e.g., ad impression, ad selection, ad conversion, etc.). Such end user local time information may be associated with ad performance information.

Alternatively, or in addition, the present invention may track ad performance information on the basis of end user local time information. The present invention may use this local time performance information to automatically adjust (with the advertiser's consent) price information (such as a maximum price the advertiser is willing to pay) for an ad to improve a score of the ad.

Alternatively, or in addition, the present invention may select or modify the content of an ad creative, and/or of a landing page using end user local time information. For example, end user local time information may be inserted into an ad creative. As another example, different landing pages with different content can be used for different end user local times.

The present invention may also provide tools, such as user interfaces, to allow an advertiser to enter and/or modify end user local time information, such as end user local time information used for targeting and end user local time-dependent price information.

3. BRIEF DESCRIPTION OF THE DRAWINGS

FIG. 11 is a block diagram of exemplary apparatus that may perform various operations in a manner consistent with the present invention.

4. DETAILED DESCRIPTION

The present invention may involve novel methods, apparatus, message formats, and/or data structures for obtaining and using end user local time information in an ad system. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as any patentable subject matter described.

In the following, environments in which, or with which, the present invention may operate are described in §4.1. Then, exemplary embodiments of the present invention are described in §4.2. Finally, some conclusions regarding the present invention are set forth in §4.3.

§4.1 Environments in which, or with which, the Present Invention May Operate

§4.1.1 Exemplary Advertising Environment

Figure 1:
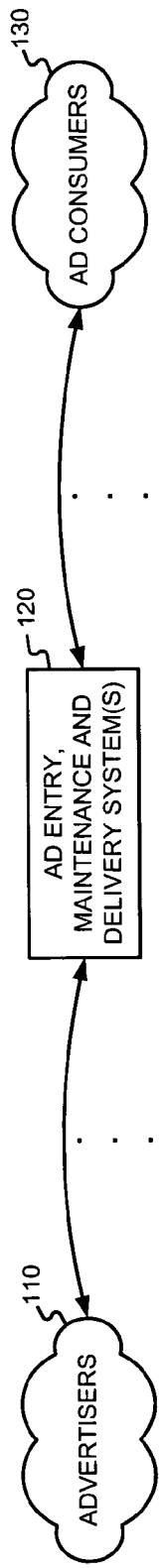
FIG. 1 is a high-level diagram showing parties or entities that can interact with an advertising system.

FIG. 1 is a high level diagram of an advertising environment. The environment may include an ad entry, maintenance and delivery system (simply referred to as an ad server) 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or click-through related to the ad occurred) to the system 120. This usage information may include measured or observed user behavior related to ads that have been served.

Figure 2:
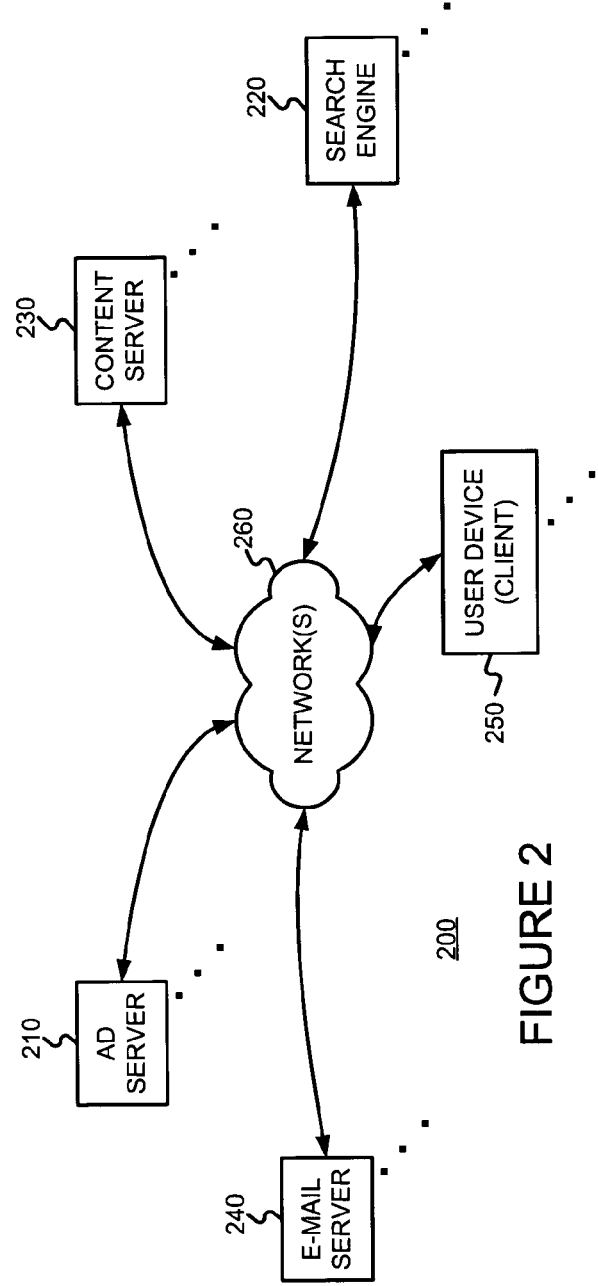
FIG. 2 is a diagram illustrating an environment in which, or with which, the present invention may operate.

The ad server 120 may be similar to the one described in FIG. 2 of U.S. patent application Ser. No. 10/375,900 (incorporated herein by reference), entitled "SERVING ADVERTISEMENTS BASED ON CONTENT," filed on Feb. 26, 2003 and listing Darrell Anderson, Paul Bucheit, Alex Carobus, Claire Cui, Jeffrey A. Dean, Georges R. Harik, Deepak Jindal, and Narayanan Shivakumar as inventors. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, end user local time information, syndication information, etc. For example, Honda may have one advertising campaign for its automotive line, and a separate advertising campaign for its motorcycle line. The campaign for its automotive line may have one or more ad groups, each containing one or more ads. Each ad group may include targeting information (e.g., a set of keywords, a set of one or more topics, etc.), and price information (e.g., maximum cost (cost per click-though, cost per conversion, etc.)). Alternatively, or in addition, each ad group may include an average cost (e.g., average cost per click-through, average cost per conversion, etc.). Therefore, a single maximum cost and/or a single average cost may be associated with one or more keywords, and/or topics. As stated, each ad group may have one or more ads or "creatives" (That is, ad content that is ultimately rendered to an end user). Each ad may also include a link to a URL (e.g., a landing Web page, such as the home page of an advertiser, or a Web page associated with a particular product or service). Consistent with the present invention, the ad information may include end user local time targeting information, end user local time performance information, and/or end user local time price information. Naturally, the ad information may include more or less information, and may be organized in a number of different ways.

FIG. 2 illustrates an environment 200 in which the present invention may be used. A user device (also referred to as a "client" or "client device") 250 may include a browser facility (such as the Explorer browser from Microsoft, the Opera Web Browser from Opera Software of Norway, the Navigator browser from AOL/Time Warner, etc.), an e-mail facility (e.g., Outlook from Microsoft), or any other software application or hardware device used to view content, etc. A search engine 220 may permit user devices 250 to search collections of documents (e.g., Web pages). A content server 210 may permit user devices 250 to access documents. An e-mail server (such as Hotmail from Microsoft Network, Yahoo Mail, etc.) 240 may be used to provide e-mail functionality to user devices 250. An ad server 210 may be used to serve ads to user devices 250. The ads may be served in association with search results provided by the search engine 220. However, content-relevant ads may be served in association with content provided by the content server 230, and/or e-mail supported by the e-mail server 240 and/or user device e-mail facilities.

As discussed in U.S. patent application Ser. No. 10/375, 900 (introduced above), ads may be targeted to documents served by content servers. Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geolocation information, end user local time information, document information, etc. Consistent with the present invention, the request may also include end user local time information, or at least information from which end user local time information may be derived or estimated.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when (such as end user local time information), and/or where the ads are to be rendered (e.g., position, click-through or not, impression time, impression date, size, conversion or not, etc.) back to the ad server 120/210. Alternatively, or in addition, such information may be provided back to the ad server 120/210 by some other means. Consistent with the present invention, the ad server 120/210 may store ad performance information on the basis of end user local time information.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as end user local time information, geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc. Consistent with the present invention, the request may also include end user local time information, such as end user local time information about an end user that submitted a search query, or information from which such local time information can be derived or estimated.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 220 may transmit information about the ad and when (e.g., end user local time), where (e.g., geolocation), and/or how the ad was to be rendered (e.g., position, click-through or not, impression time, impression date, size, conversion or not, etc.) back to the ad server 120/210. Alternatively, or in addition, such information may be provided back to the ad server 120/210 by some other means. Consistent with the present invention, the ad server 120/210 may store ad performance information on the basis of end user local time information.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under, over, or otherwise in association with an e-mail.

Although the foregoing examples described servers as (i) requesting ads, and (ii) combining them with content, one or both of these operations may be performed by a client device (such as an end user computer for example).

§4.1.2 Definitions "End user local time information" may include one or more of: at least one local time-of-day; at least one local time-of-day range; at least one local date; at least one local day-of-week; at least one local date range; at least one local day-of-week range; at least one local season; etc.

"Geolocation information" may include information specifying one or more of one or more countries, one or more (inter-country) regions, one or more states, one or more metro areas, one or more cities, one or more towns, one or more boroughs, one or more areas with common zip codes, one or more areas with common telephone area codes, one or more areas served by common cable head end stations, one or more areas served by common network access points or nodes, etc. It may include latitude and/or longitude, or a range thereof. It may include information, such as an IP address, from which a user location can be estimated.

Online ads, such as those used in the exemplary systems described above with reference to FIGS. 1 and 2, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad was served, a search query or search results associated with the serving of the ad, a user characteristic (e.g., their geolocation, the language used by the user, the type of browser used, previous page views, previous behavior), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served (absolute or local), time of week served (absolute or local), time of year served (absolute or local), etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain geolocation, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location.

A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information. It may also include a user's local time, or an estimation of the end user's local time.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

Various exemplary embodiments of the present invention are now described in §4.2.

§4.2 Exemplary Embodiments

Figure 3:
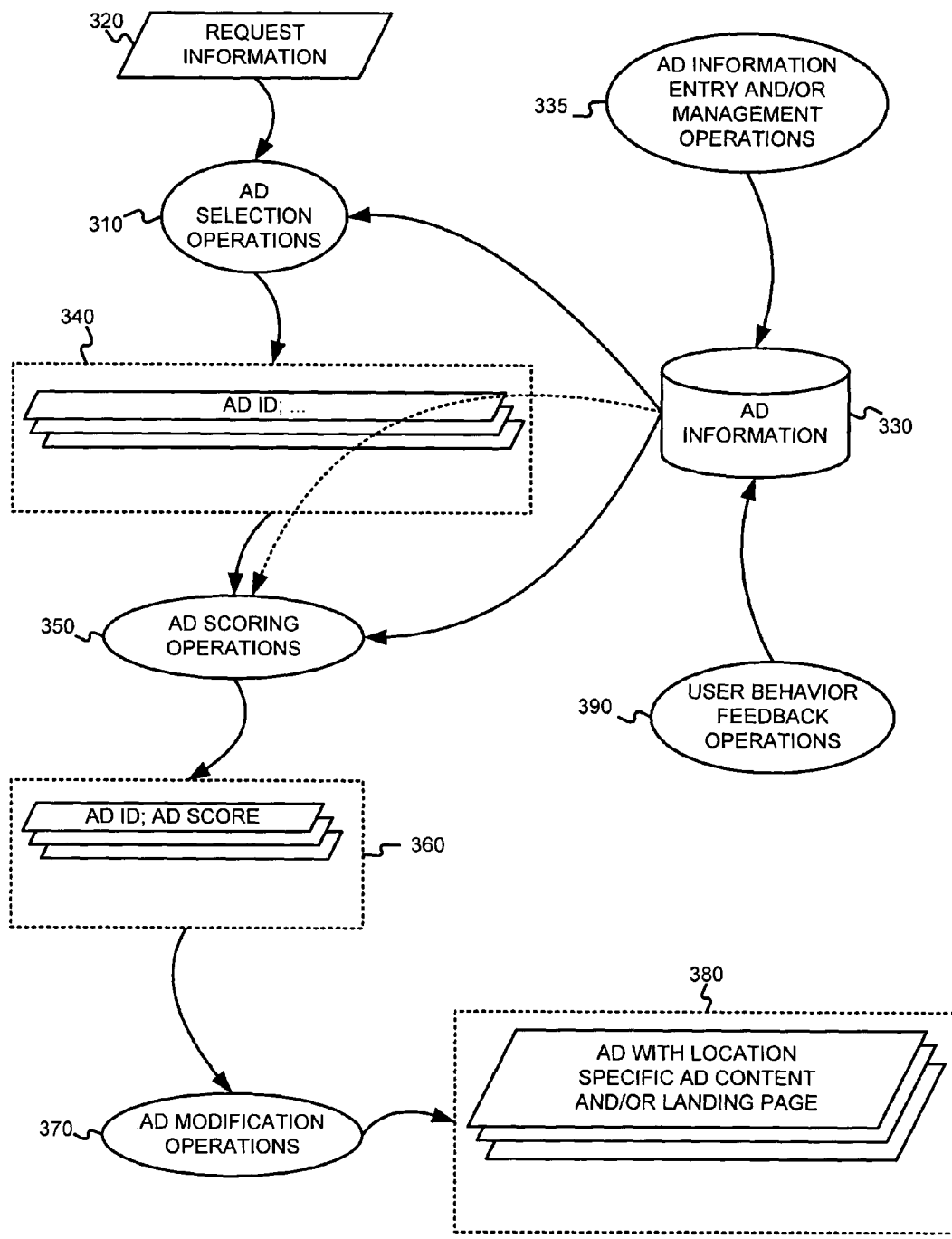
FIG. 3 is a bubble diagram illustrating various operations that may be performed, and various information that may be used, and/or generated by the present invention.

FIG. 3 is a bubble diagram illustrating various operations that may be performed by the present invention, and various information that may be used, and/or generated, by the present invention. An ad selection operation 310 may be used to generate a set of ads 340 using ad information 330 and request information 320. In an exemplary embodiment of the present invention, the set of ads 340 may include ads relevant to the request information 320. For example, if the request information 320 is associated with a search query, the ads 340 may be relevant to terms of the search query. Alternatively, if the request information 320 is associated with a document to be served, the ads 340 may be relevant to content of the document. In any event, the request information 320 may include end user local time information. For example, the request information 320 may include the local time of an end user that submitted a search query or document request (or the local time at some other entity, such as a cable head end, a network access point, etc., associated with the request), or information from which such end user local time information can be derived (e.g., IP address of a requester device, IP address from HTTP request, request language, country designated by domain, portal, etc.). For example, end user local time information can be derived from end user geolocation information. Assumptions about end user local time can be made using population densities of various time zones. Exemplary data structures that may be used to store request information 320 and ad information 330 are described in §4.2.1 below with reference to FIGS. 4 and 5, respectively. Exemplary methods that may be used to perform the ad selection operations 310 in a manner consistent with the present invention are described in §4.2.2 below with reference to FIG. 6.

Still referring to FIG. 3, a scoring operation 350 may be used to generate a set 360 of ads and associated scores using the first set 340 of ads and ad information 330. The scoring operations 350 in a manner consistent with the present invention may consider end user local time information, such as end user local time performance information, and/or end user local time price information for example, of the ads. Exemplary methods that may be used to perform the scoring operations 350 in a manner consistent with the present invention are described in §4.2.2 below with reference to FIG. 7.

Ad modification operations 370 may be used to generate a set 380 of ads with end user local time specific creative content, and/or an end user local time specific landing page from the set 360 of ads. Although not shown, the ad modification operations 370 may use end user local time information. Exemplary methods that may be used to perform the ad modification operations 370 in a manner consistent with the present invention are described in §4.2.2 below with reference to FIG. 8.

The ad information 330 may include end user local time-based performance information. Such information may be provided, and/or tracked by user behavior feedback operations 390. Exemplary methods that may be used to perform the user behavior feedback operations 390 in a manner consistent with the present invention are described in §4.2.2 below with reference to FIG. 9.

Finally, the ad information 330 may include end user local time targeting, and/or end user local time price information. This information may be entered and/or modified by advertisers, or their representatives (simply referred to as "advertisers" without loss of generality) via ad information entry and/or management operations 335. Exemplary methods that may be used to perform these operations 335 in a manner consistent with the present invention are described in §4.2.2 below with reference to FIG. 10.

The present invention need not provide, and/or use all of the operations and information described with reference to FIG. 3. The present invention need not perform the operations in the order shown. Finally, the present invention may combine, or separate functionality described with respect to the various operations. For example, the selection and scoring operations 310 and 350 may be combined into a single operation.

§4.2.1 Exemplary Data Structures

Figure 4:
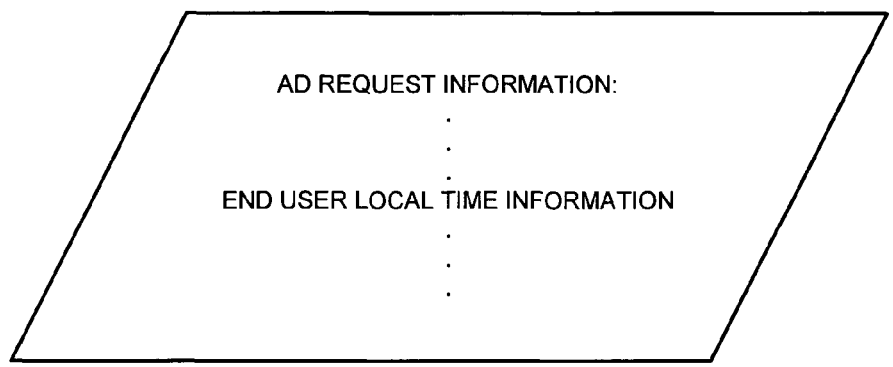
FIG. 4 illustrates exemplary request information that is consistent with the present invention.

FIG. 4 illustrates exemplary ad request information 320' that is consistent with the present invention. The ad request information 320' may include information such as that described in §4.1.1 above. Further, the ad request information may include end user (or some other entity, simply referred to as "end user" in the specification) local time information, or information from which end user local time information can be derived or estimated. For example, the end user local time information may include one or more of a local time-of-day, a local day-of-week, a local date, a local month, a local season, etc.

The end user local time information may be encoded in various ways that will be apparent to those skilled in the art.

The present invention may be used to derive or estimate end user local time information from other information. For example, the present invention may use known techniques (such as that used by the "NetAcuity" product from Digital Envoy of Norcross, Ga.) to map Internet protocol ("IP") address and/or domain information to end user local time information. As another example, Internet service providers may have many dial-in access servers, each associated with a telephone area code, which may associated with a particular time zone. Alternatively, the present invention may simply accept end user local time information. For example, the end user, or a client device used by the end user, may have voluntarily provided end user local time information. As another example, the end user local time information may have been derived and provided by a third party.

Figure 5:
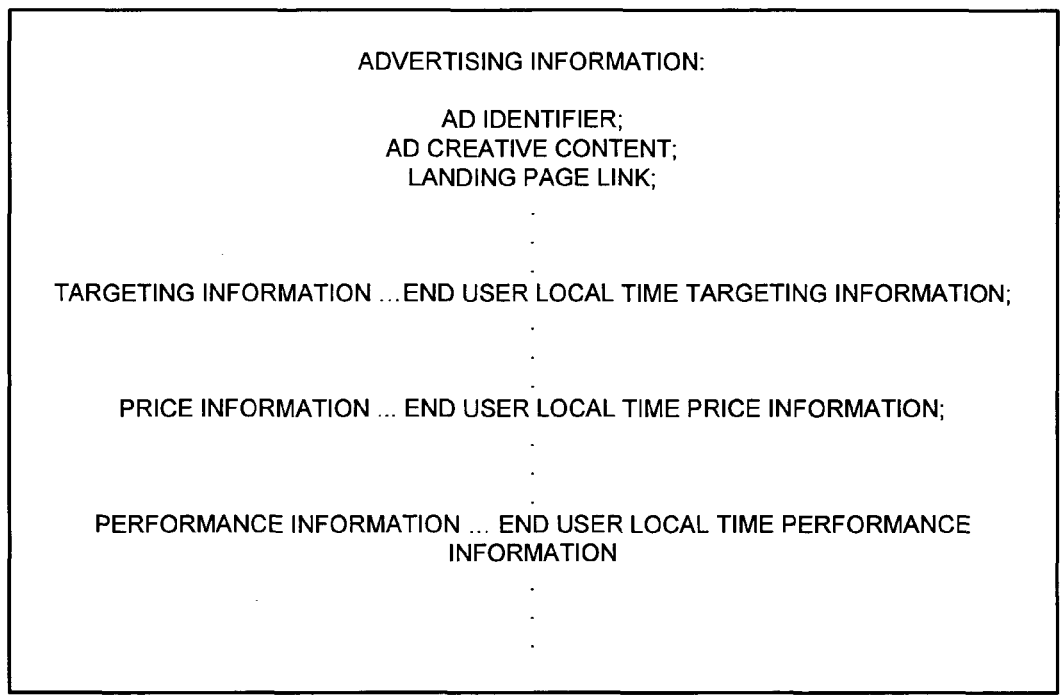
FIG. 5 illustrates exemplary ad information that is consistent with the present invention.

FIG. 5 illustrates exemplary ad information 330' that is consistent with the present invention. The ad information 330' may include information such as that described in §4.1.1 above. For example, the ad information 330' may include a unique ad identifier, ad creative content (or a pointer to such creative content), and/or a landing page link, etc. Further, the exemplary ad information 330' may include at least one of end user local time targeting information and end user local time price information. End user local time performance information (not shown) may be tracked and associated with the ad.

End user local time targeting information may include one or more of (e.g., a range of) local time-of-day, (e.g., a range of) local day-of-week, (e.g., a range of) local date, (e.g., a range of) local month, a local season, etc. Thus, for example, a national shipping company may target ads touting pickup until midnight for next day delivery for local time-of-day ranging from 7:30 PM to 11:55 PM, while targeting ads touting discounted shipping for local time-of-day ranging from 12:00 midnight to 7:29 PM.

End user local time price information may include price information for each of one or more (e.g., a range of) local time-of-day, one or more (e.g., a range of) local day-of-week, one or more (e.g., a range of) local date, one or more local (e.g., a range of) month, one or more local season, etc. The price information should correspond to the end user local time targeting information. In one embodiment of the present invention, an advertiser-specified or system-learned matrix (with time-slots (or time ranges) in one direction and ad targets (e.g., keywords or concepts) in the other direction) of price information may be provided. The matrix may include price information for some or all combinations of times and targets. The price information in this matrix may be used in the determination of scores of competing (relevant) ads.

In one embodiment of the present invention, end user local time targeting information can be inferred from end user local time price information. For example, if an advertiser submits a maximum bid per impression of $1.50 for the local time of day from 7:30 PM to 11:55 PM, it may be assumed that the advertiser wants to target its ads to end users whose local time is 7:30 PM to 11:55 PM. Similarly, if the advertiser submits a bid per impression of $0.00 for a given local day of the week, it may be assumed that the advertiser wants to avoid serving its ads to end users with that local day of the week. For example, if the courier introduced above has no pickup on Sunday, it can provide the following geolocation price information:

Local Time of Day: 7:30 PM-11:55 PM: $1.50/impression;
Local Time of Day: 12 midnight-7:29 PM $0.35/impression; and
Local Day: Sunday $0.00/impression.

Any contention that may arise may be resolved using non-ambiguous rules. For example, one such rule may be the lower-price information overrides any other pricing information. Alternatively, the highest price may be used. These rules may be default rules, applied across all advertises, or may be advertiser specific rules. In the later case, an advertiser user interface (U/I) may alert advertisers to any potential contentions and prompt them for a rule to resolve it.

§4.2.2 Exemplary Methods

Figure 6:
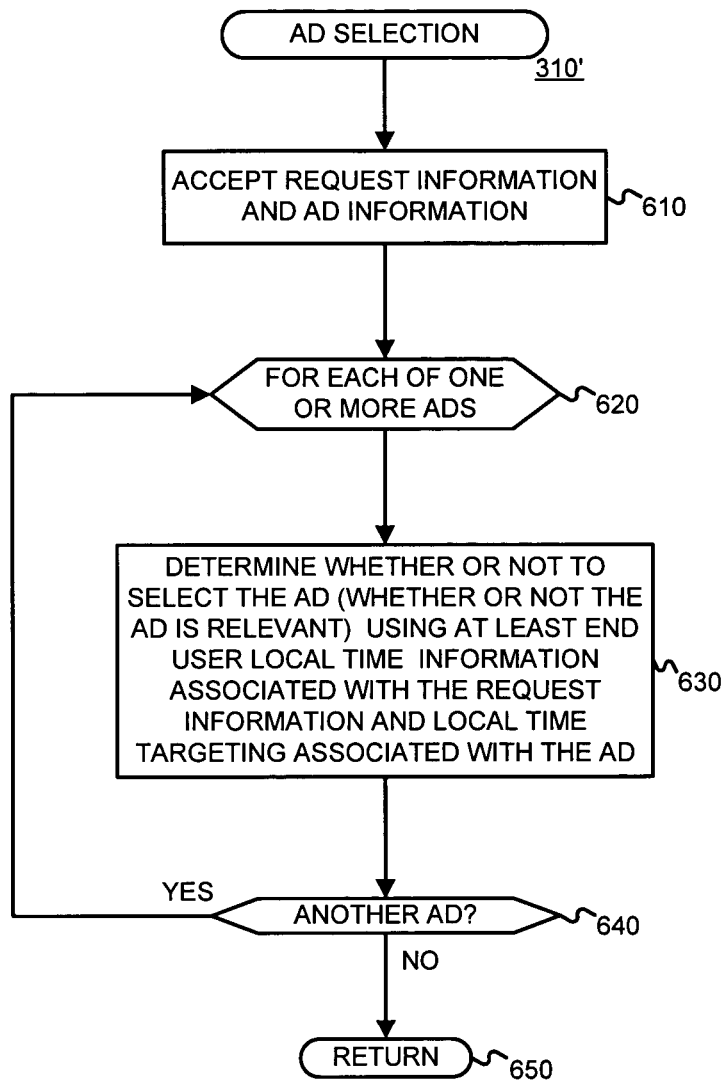
FIG. 6 is a flow diagram of an exemplary method for performing an ad selection operation in a manner consistent with the present invention.

FIG. 6 is a flow diagram of an exemplary method 310' for performing an ad selection operation 310 in a manner consistent with the present invention. Request information and ad information is accepted. (Block 610) The request information may include, among other things, end user local time information. The advertising information may include, among other things, end user local time targeting information. As indicated by loop 620-640, an act is performed for each of one or more ads. More specifically, a relevancy measure of the ad is determined using at least the end user local time information associated with the request information and end user local time targeting information associated with the ad. (Block 630) After each of the one or more ads has been processed, the method 310' is left. (Node 650).

The relevancy of the ad may be determined using keyword targeting information associated with the ad, content relevance information associated with the ad, etc. In any event, the relevancy of the ad may be determined using, at least, end user local time information of the request and the ad.

Naturally, end user local time targeting may be just one of a number of relevancy factors. For example, ad relevancy may also consider (a) a comparison of ad relevancy information to the content of a document requested, (b) ad keyword targeting with respect to terms of a search query, (c) user demographic information, (d) user behavior information, (e) other location targeting information, etc.

Figure 7:
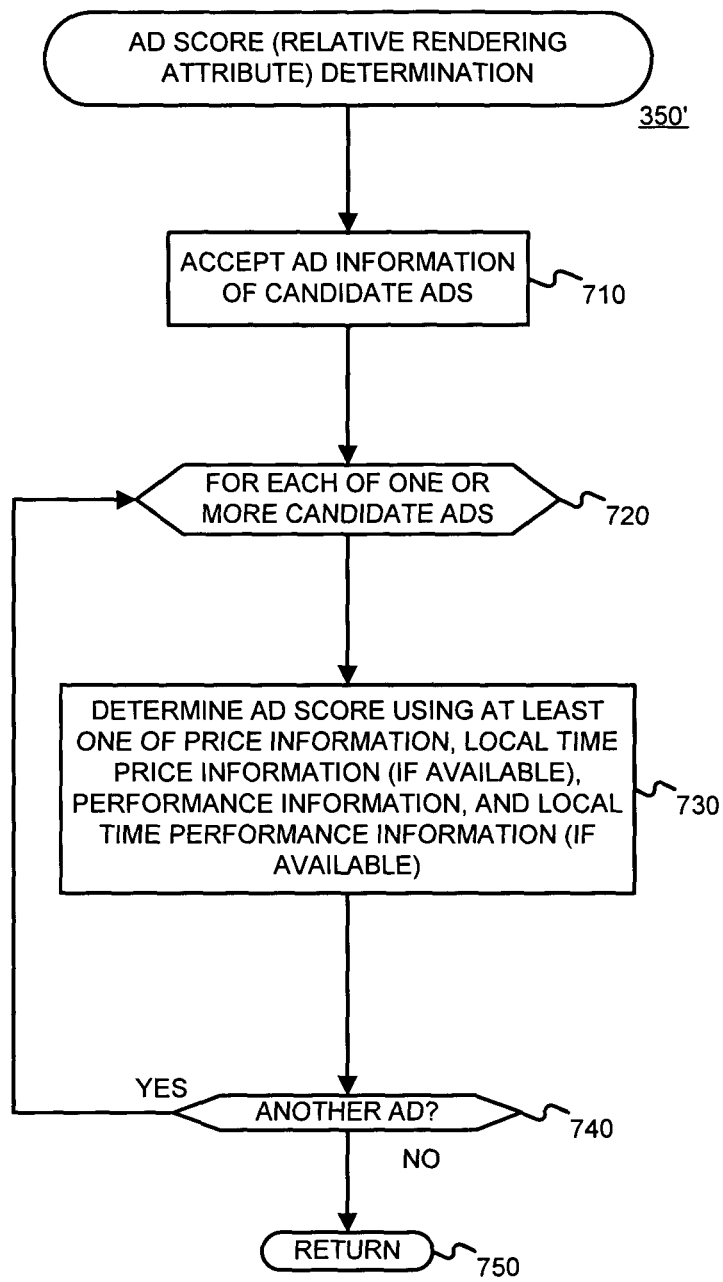
FIG. 7 is a flow diagram of an exemplary method for performing a scoring operation in a manner consistent with the present invention.

FIG. 7 is a flow diagram of an exemplary method 350' for performing a scoring operation 350 in a manner consistent with the present invention. The second score may be used to determine a relative presentation attribute (e.g., size, position, color, volume, etc.) of the ad. Ad information of candidate ads is accepted. (Block 710) As indicated by loop 720-740, an act is performed for each of one or more ads. More specifically, an ad score is determined using at least one of price information, end user local time price information (if available), performance information, and end user local time performance information (if available). (Block 730) For example, techniques for determining a score using performance information, such as those described in U.S. patent application Ser. No. 10/112,656 (incorporated herein by reference), titled "METHODS AND APPARATUS FOR ORDERING ADVERTISEMENTS BASED ON PERFORMANCE INFORMATION," filed on Mar. 29, 2002, may be modified in accordance with the present invention. Similarly, techniques for determining a score using performance information and price information, such as those described in U.S. patent application Ser. No. 10/11,654 (incorporated herein by reference), titled "METHODS AND APPARATUS FOR ORDERING ADVERTISEMENTS BASED ON PERFORMANCE INFORMATION AND PRICE INFORMATION," filed on Mar. 29, 2002, may be modified in accordance with the present invention. Further, techniques for determining a score using price information without performance information may be modified in accordance with the present invention.

Thus, for example, in accordance with the present invention, an ad score (which may be used in an ad attribute arbitration, such as a position auction for example) may be determined using any of the following combinations of information: (a) local time of interest price information; (b) local time of interest performance information; (c) local time of interest price information and performance information; (d) local time of interest price information and local time of interest performance information; and (e) price information and local time of interest performance information. Naturally, the score may be determined using additional information, such as some measure of advertiser quality for example. If neither local time of interest price information, nor local time of interest performance information is available for an ad, its score may simply be a function of any of the following combinations of information: (a) price information; (b) performance information; and (c) price information and performance information. In the foregoing examples, the local time of interest may be end user local time. Once all of the candidate ads are processed, the method 350' is left. (Node 750).

There are a number of ways to determine an ad score consistent with block 730. A few exemplary ways are described below. If an ad system wants to maximize revenue, it may determine a score by multiplying a price per performance value by the performance of the ad. For example, it may determine cost per click*click-through rate, or cost per conversion*conversion rate. Prices may be discounted or adjusted. The present invention can advantageously use end user local time information, if available, to improve a revenue estimate. For example, suppose the local time (pacific standard time) of an end user to whom the ad will be directed is 10:30 PM. Suppose further that the following otherwise equally relevant ads have the associated information shown:

Ad A: max cost per click=$0.25;
  max cost per click=$1.50 for local time-of-day from 7:30 PM-11:55 PM;
  CTR=0.02 for local time-of-day ranges 12 midnight to 1 AM;
  CTR=0.01 for local time-of-day ranges 1 AM-2 AM, 2 AM-3 AM, 3 AM-4 AM, 4 AM-5 AM, 5 AM-6 AM;
  CTR=0.02 for local time-of-day ranges 6 AM-7 AM, 7 AM-8 AM;
  CTR=0.03 for local time-of-day ranges 8:00 AM-9:00 AM;
  CRT=0.04 for local time-of-day ranges 9:00 AM-10:00 AM, 10:00 AM-11:00 AM, 11:00 AM-12 noon, 12 noon-1:00 PM, 1:00 PM-2:00 PM, 2:00 PM-3:00 PM;
  CTR=0.055 for local time-of-day ranges 3:00 PM-4:00 PM, 4:00 PM-5:00 M, 5:00 PM-6:00 PM;
  CTR=0.110 for local time-of-day range 6:00 PM-7:00 PM;
  CTR=0.250 for local time-of-day range 7:00 PM-8:00 PM;
  CRT=0.500 for local time-of-day ranges 8:00 PM-9:00 PM, 9:00 PM-10:00 PM, 10:00 PM-11:00 PM; and
  CRT=0.550 for local time-of-day range 11:00 PM-12 midnight.
Ad B: max cost per click=$0.50;
  CTR=0.07 for all local time-of-day ranges.

With end user local time scoring, for the end user whose local time is 10:30 PM a product score for ad A would be 0.75 (=1.50*0.50), while that for ad B would be 0.035 (=0.50*0.07). Suppose another end user on the east coast submits an identical request at the identical absolute time— 1:30 AM EST. For this end user, the product score for ad A would be 0.0025 (=0.25*0.01), while that for ad B would remain 0.035 (=0.50*0.07). Thus, for this example, at the particular absolute time, ad A is much more useful than ad B to a user on the west coast, while the reverse is true for a user on the east coast.

As illustrated in this example, the (i) end user local time (range) performance information, (ii) end user local time (range) price information, and (iii) the end user local time (range) targeting information need not correspond with one another. For example, end user local time targeting price information may correspond to a five minute range, while end user local time, time-of-day performance information may be tracked in six-four hour intervals.

In one embodiment of the present invention, if more specific end user local time price information is not available, more general end user local time price information may be used in the determination of a score. Similarly, if more specific end user local time performance information is not available, more general end user local time performance information may be used. Thus, for example, an ad with only price information and performance information for end user local time range 1:00 PM-1:00 PM may compete with an ad with price and performance information for end user local time range 4:00 PM-5:00 PM when serving an ad request to a user whose local time is 4:30 PM.

Figure 8:
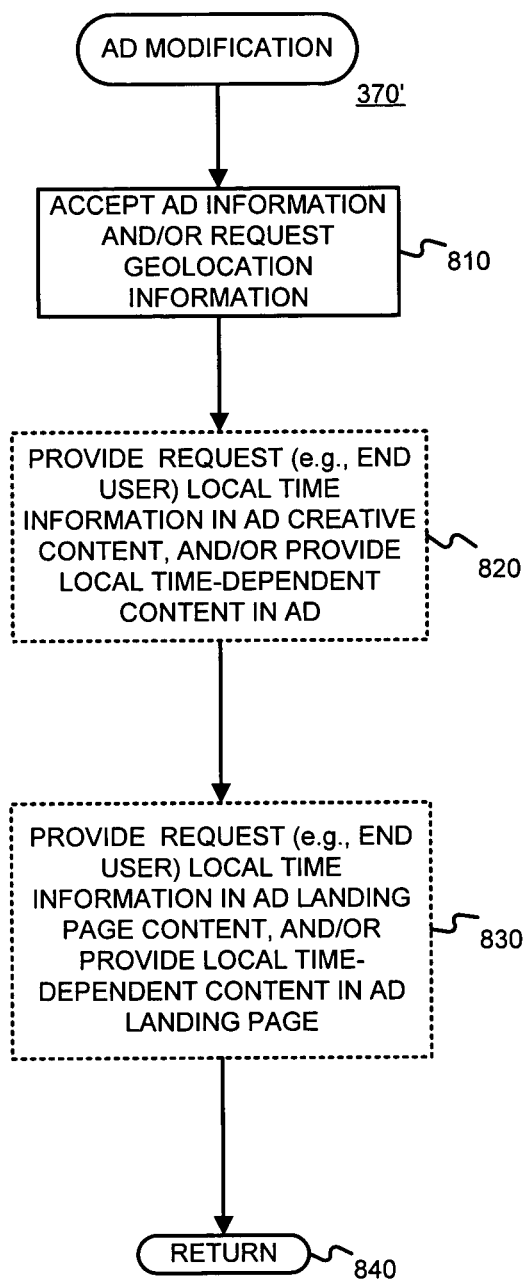
FIG. 8 is a flow diagram of an exemplary method for performing an ad modification operation in a manner consistent with the present invention.

FIG. 8 is a flow diagram of an exemplary method 370' for performing an ad modification operation 370 in a manner consistent with the present invention. Ad information and/or request end user local time information is accepted. (Block 810) Request end user local time information may be provided in the creative content of the ad, and/or the ad may be provided with end user local time-dependent content (e.g., one of a number of candidate ad marketing messages may be selected using end user local time information). (Block 820) Alternatively, or in addition, request end user local time information may be provided in the content of a landing page, and/or end user local time-dependent content may be provided in the ad landing page (e.g., one of a number of candidate landing pages may be selected using end user local time information). (Block 830).

Referring back to block 820, the content of an ad creative may be modified by modifying text or by selecting one of a number of candidate texts. For example, assume that an ad request indicated that the end user' local time is 8:00 PM, and assume that an ad for a courier was targeted to the local time range 7:30 PM-11:55 PM. The normal ad creative may read, "Reliable Courier Service, Nationwide . . . all at competitive prices." The modified ad creative may read, "Pickup for next day delivery until MIDNIGHT available." The end user local time information may simply be added to, or replace a portion of, the ad creative. For example, "It's 8:00 PM! Will your courier pick up today? We WILL!" The end user local time information may be used to select a number of candidate ad creatives.

Referring back to block 830, the one of a plurality of ad landing pages may be selected based on end user local time information. For example, if the end user local time information of the request indicates that the end user's time is between 7:30 PM and 11:55 PM, the courier may have a landing page emphasizing its pickup until midnight service. If, on the other hand, the end user local time information of the request indicates that the end user's local time is outside this time range, the courier may have a landing page emphasizing its discount shipping.

Alternatively, or in addition to generating creative content targeted towards a specific end user local time, advertisement attributes may be determined using end user local time information. For example, prices, products, and/or services may be specific to an end user's local time.

Thus, by using end user local time information, the present invention can be used to adapt a marketing message to the local time of an end user to perceive the ad.

Figure 9:
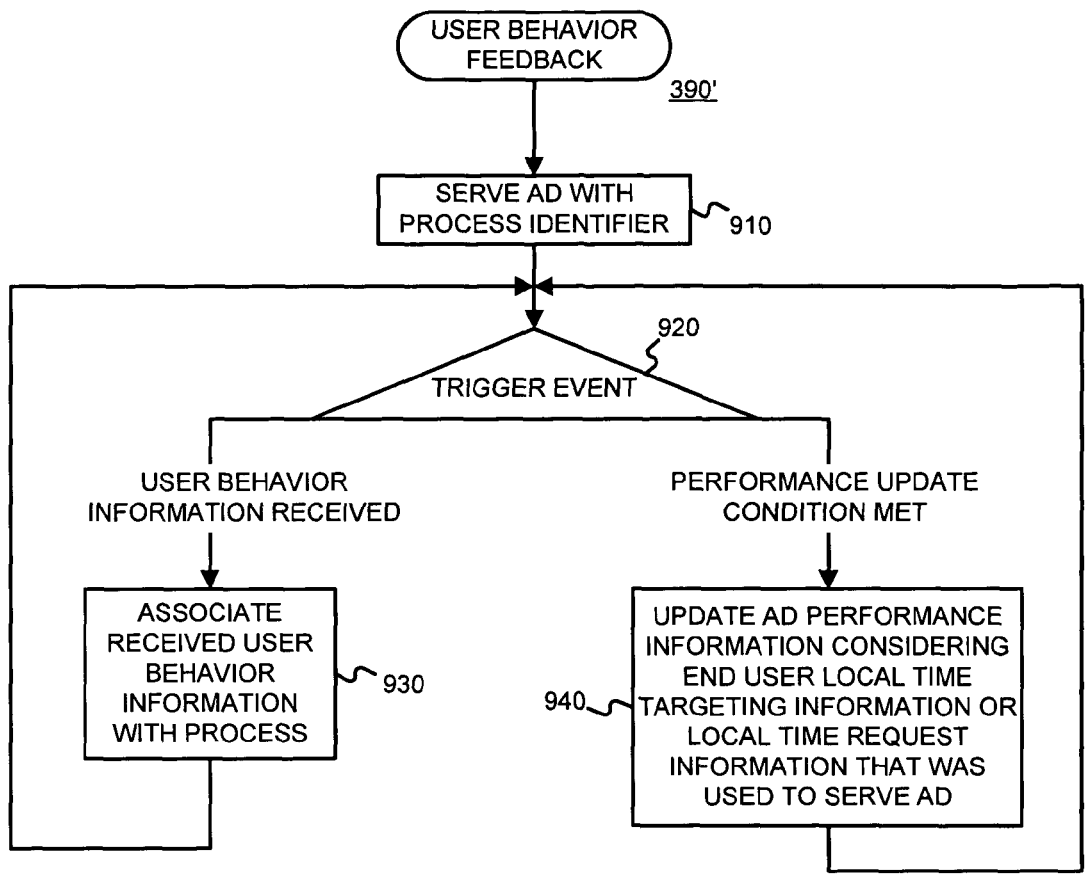
FIG. 9 is a flow diagram of an exemplary method of performing user behavior feedback operations in a manner consistent with the present invention.

FIG. 9 is a flow diagram of an exemplary method 390' for performing user behavior feedback operation 390 in a manner consistent with the present invention. Recall from scoring operation 350 that end user local time specific performance information may be used in determining a score for an ad. The method 390' of FIG. 9 is one way to track such information. Each time an ad is served, this event may be identified by a unique process identifier (e.g., ad server IP address, a (local) date and a (local) time of day). The process identifier may be associated with any end user local time information used when serving the ad, or end user local time information of the relevant request. The ad may be served with its process identifier. (Block 910) As indicated by event block 920, different branches of the method 390' may be performed in response to different events. For example, if user behavior information is received, the received user behavior information is associated with the process identifier (and therefore the end user local time information, if any, used when originally serving the ad) (Block 930) before the method 390' branches back to event block 920. If a condition for updating performance information is met (e.g., the receipt of performance information, the receipt of a certain amount of performance information, a time expiration since the last update, an absolute time/date, etc), the ad performance information is updated considering end user local time targeting information, or end user local time request information associated with the ad serving process (Block 940), before the method 390' branches back to event block 920.

Thus, the method 390' can be used to track ad performance information accounting for end user local time information (which may have been used when serving the ad). Various alternative ways of associating end user local time information with performance information are possible.

Figure 10:
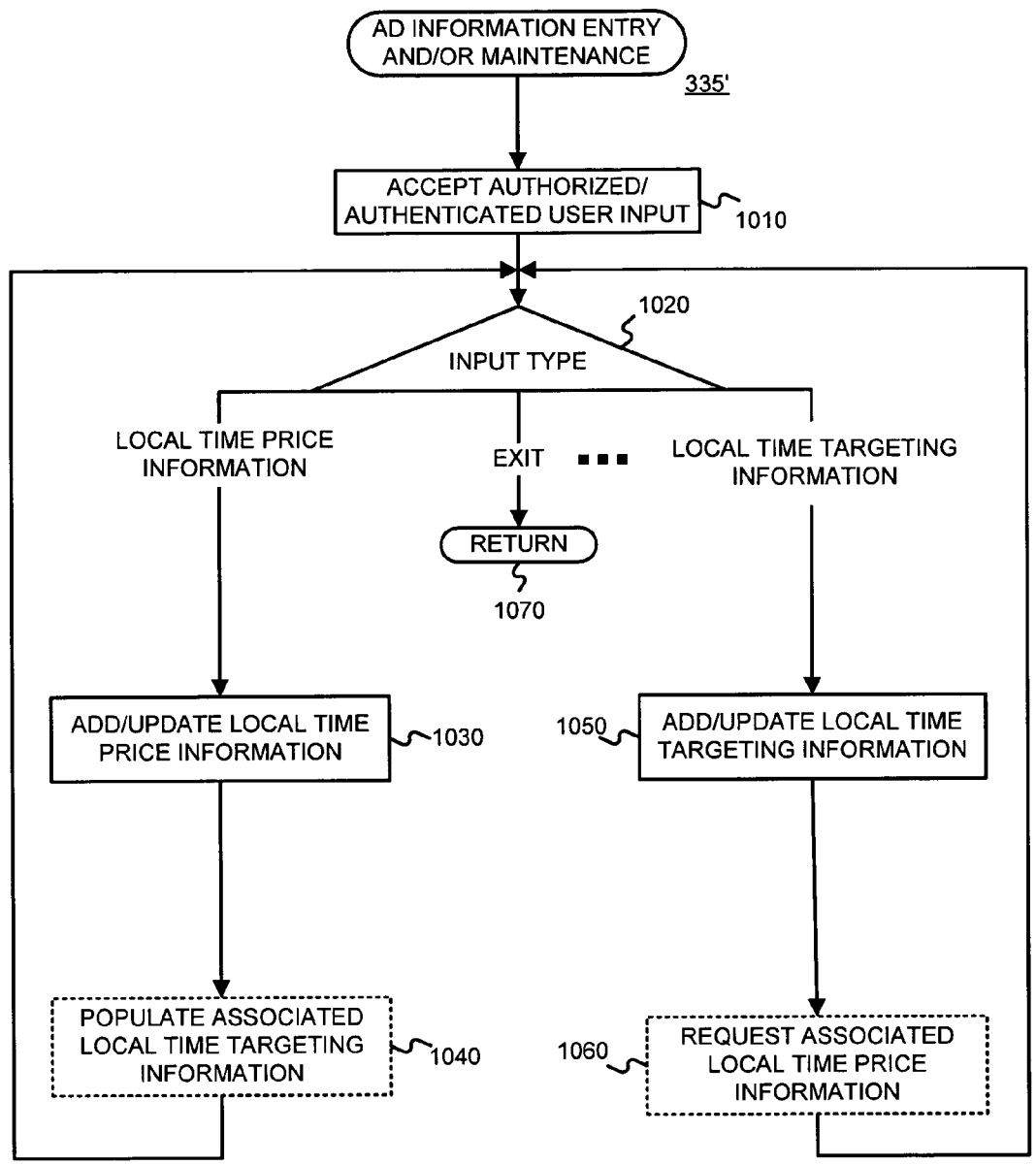
FIG. 10 is a flow diagram of an exemplary method for performing ad information entry and/or management operations in a manner consistent with the present invention.

FIG. 10 is a flow diagram of an exemplary method 335' of performing ad information entry and/or management operations in a manner consistent with the present invention. Recall from FIG. 5 that ad information 330' may include one or more of end user local time targeting information and end user local time price information. The method 330' accepts authorized and/or authenticated user input. (Block 1010) As indicated by event block 1020, various branches of the method 335' may be performed in response to various input types. If the user inputs end user local time price information, such information is added or updated. (Block 1030) Associated end user local time targeting information may also be populated or revised in accordance with the price information. (Block 1040) For example, if a user enters a maximum price per click of $1.50 for local time 7:30 PM-11:55 PM, and if the ad does not include end user local time targeting for this time range, such information may be added. If the user later changes this maximum price per click for this time range to $0.00, the end user local time location targeting for this time range may be turned off or removed. Referring back to block 1020, if the user inputs end user local time targeting information, the end user local time targeting information is added or updated. (Block 1050) Associated end user local time price information may be requested (Block 1060) but need not be provided.

Other features of the advertiser user interface may be provided to make entering and/or managing advertising information more convenient. For example, if any advertiser has an existing campaign, but wants to add an end user local time targeted campaign, bulk importing support may be provided so that the advertiser does not need to re-enter common advertising information. Help features may be used to suggest additional end user local time information (more of the same type of ranges (e.g., local time of day, local day of week, local date, local month, etc.), more specific ranges, more general ranges, etc.) in response to entered end user local time information. As another example, a U/I, such as a series of sliders for example, may be provided to allow advertises to manually increase or decrease relative bid amounts based on the local time-of-day, local day-of-week, etc. The U/I can allow advertisers to select automated pricing tools. For example, a process can use selection and/or conversion tracking data to automatically raise price information when selections/conversions are high and lower price information when selections/conversions are low.

The advertiser U/I may also provide information (e.g., ad performance) filtered using end user local time.

The end user local time targeting information may be applied on a keyword-by-keyword basis (or topic-by-topic, or concept-by-concept basis). Alternatively, the end user local time targeting information may be applied across all keywords (or topics, or concepts) targeted in an ad campaign.

§4.2.3 Exemplary Apparatus

FIG. 11 is high-level block diagram of a machine 1100 that may perform one or more of the operations discussed above. The machine 1100 basically includes one or more processors 1110, one or more input/output interface units 1130, one or more storage devices 1120, and one or more system buses and/or networks 1140 for facilitating the communication of information among the coupled elements. One or more input devices 1132 and one or more output devices 1134 may be coupled with the one or more input/output interfaces 1130.

The one or more processors 1110 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1120 and/or may be received from an external source via one or more input interface units 1130.

In one embodiment, the machine 1100 may be one or more conventional personal computers. In this case, the processing units 1110 may be one or more microprocessors. The bus 1140 may include a system bus. The storage devices 1120 may include system memory, such as read only memory (ROM) and/or random access memory (RAM). The storage devices 1120 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1132, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1110 through an appropriate interface 1130 coupled to the system bus 1140. The output devices 1134 may include a monitor or other type of display device, which may also be connected to the system bus 1140 via an appropriate interface. In addition to (or instead of) the monitor, the personal computer may include other (peripheral) output devices (not shown), such as speakers and printers for example.

§4.2.4 Alternatives

Although the foregoing examples used end user local time-of-day information, the present invention may also use end user day-of-week information, end user date information, end user season information, etc.

Different end user local time information specified by the advertiser may have different scope, and this may lead to contention regarding which targeting or price information to use. For example, an advertiser may be willing to pay $1.50 per click for ads targeted to local user time of day range of 7:30 PM-11:55 PM, but may not be willing to pay anything per click for ads targeted to Sunday. The question then arises of how to handle an ad request with an end user local time of Sunday, 9:00 PM. As discussed above, such contentions may be resolved using default rules. An exemplary set of default rules is now described. Generally, for purposes of determining ad relevancy and/or ad scoring, a match of more general end user local time information category may be weighted more heavily than a match of more specific user local time information category (e.g., day-of-week trumps time-of-day). On the other hand, within a category of end user local time information, for purposes of determining ad relevancy and/or ad scoring, a match of a more specific user local time information range may be weighted more heavily than a match of a more general user local information range (e.g., a time of day range of 10:30 AM-11:45 AM would trump a time of day range of all AM).

A visual representation of a time-slot (or time-range) and target matrix with entries of price information, such as the matrix described in §4.2.1 above, may be used to provide visual feedback to advertisers. The visual representation may include color coding. Such visual feedback may help advertisers to avoid any contention regarding time-slots (or time ranges) for a given target. Even if simple rules are used to specify price information, providing such a visual representation may be useful to the advertiser.

Although some examples above used end user local time information as a current local time of the user, the local time information may be the local time of a location that the user is interested in. Either case may be referred to as a "local time of interest." For example, if a business traveler in a first time zone lacks Internet connectivity and asks their assistant, located in a second time zone, to look for restaurants in the first time zone, and if a search query includes a town in the first time zone, the end user local time may be assumed to be that of the first time zone even though the search query was originated from the second time zone. Similarly, information from which local time can be derived or estimated may also be referred to as "local time of interest information."

4.3 CONCLUSIONS

In view of the foregoing, the present invention allows more relevant ads to be served by using end user local time information.

What is claimed is:

1. A method performed by one or more processing devices, comprising:
    receiving a request and information indicative of a local time in a time zone from which the request was sent;
    accessing, in response to the request, a first mapping of (i) one or more first time ranges, to (ii) one or more prices to be paid for display of an advertisement;
    determining, from the one or more first time ranges in the first mapping, a particular first time range that comprises the local time;
    identifying, from the one or more prices in the first mapping, a particular price that is mapped to the particular first time range;
    accessing a second mapping of (i) one or more second time ranges, to (ii) one or more estimated performance metrics for the advertisement;
    determining, from the one or more second time ranges in the second mapping, a particular second time range that comprises the local time;
    identifying, from the one or more estimated performance metrics in the second mapping, a particular estimated performance metric that is mapped to the particular second time range; and
    determining, at least partly based on the particular price and the particular estimated performance metric, a score for the advertisement.

2. The method of claim 1, wherein the local time comprises at least one of (a) at least one local time-of-day, (b) at least one local time-of-day range, (c) at least one local date, (d) at least one local day-of-week, (e) at least one local date range, (f) at least one local day-of-week range, and (g) at least one local season.

3. The method of claim 1, wherein the score comprises a numerical value.

4. The method of claim 1, wherein the request is sent from a system that is external to the one or more processing devices; and
    wherein the time zone comprises a time zone of the system.

5. The method of claim 1, wherein:
    the local time comprises a first local time;
    the time zone comprises a first time zone;
    the request comprises a first request;
    the particular price comprises a first particular price;
    the score comprises a first score;
    the advertisement comprises a first advertisement;
    wherein the method further comprises:
        receiving a second request and information indicative of a second local time in a second time zone from which the second request was sent, wherein the first time zone differs from the second time zone, and wherein the first local time and the second local time comprise a same time when the second local time is converted to a time in the first time zone;
        determining, from the one or more first time ranges in the first mapping, a third particular time range that comprises the second local time;
        identifying, from the one or more prices in the first mapping, a second particular price that is mapped to the third particular time range;
        determining, at least partly based on the second particular price for the first advertisement, a second score for the first advertisement;
        identifying, in a third mapping based on the second local time, a third price for a second advertisement;
        determining, at least partly based on the third price for the second advertisement, a third score for the second advertisement, with the third score having an increased value relative to the second score; and
        selecting, at least partly based on the second score and the third score, the second advertisement for display in the second time zone, with the second advertisement being different from the first advertisement.

6. An apparatus comprising:
    one or more processing devices; and
    a computer-readable medium configured to store instructions that when executed by the one or more processing devices perform operations comprising:

receiving a request and information indicative of a local time in a time zone from which the request was sent;

accessing, in response to the request, a first mapping of (i) one or more first time ranges, to (ii) one or more prices to be paid for display of an advertisement;

determining, from the one or more first time ranges in the first mapping, a particular first time range that comprises the local time;

identifying, from the one or more prices in the first mapping, a particular price that is mapped to the particular first time range;

accessing a second mapping of (i) one or more second time ranges, to (ii) one or more estimated performance metrics for the advertisement;

determining, from the one or more second time ranges in the second mapping, a particular second time range that comprises the local time identifying, from the one or more estimated performance metrics in the second mapping, a particular estimated performance metric that is mapped to the particular second time range; and determining, at least partly based on the particular price and the particular estimated performance metric, a score for the advertisement.

7. The apparatus of claim 6, wherein the local time comprises at least one of (a) at least one local time-of-day, (b) at least one local time-of-day range, (c) at least one local date, (d) at least one local day-of-week, (e) at least one local date range, (f) at least one local day-of-week range, and (g) at least one local season.

8. The apparatus of claim 6, wherein the score comprises a numerical value.

9. The apparatus of claim 6, wherein the request is sent from a system that is external to the one or more processing devices; and wherein the time zone comprises a time zone of the system.

10. The apparatus of claim 6, wherein:

the local time comprises a first local time;
the time zone comprises a first time zone;
the request comprises a first request;
the particular price comprises a first particular price;
the score comprises a first score;
the advertisement comprises a first advertisement;
wherein the operations further comprise:
receiving a second request and information indicative of a second local time in a second time zone from which the second request was sent, wherein the first time zone differs from the second time zone, and wherein the first local time and the second local time comprise a same time when the second local time is converted to a time in the first time zone;

determining, from the one or more first time ranges in the first mapping, a third particular time range that comprises the second local time;

identifying, from the one or more prices in the first mapping, a second particular price that is mapped to the third particular time range;

determining, at least partly based on the second particular price for the first advertisement, a second score for the first advertisement;

identifying, in a second third mapping based on the second local time, a third price for a advertisement;

determining, at least partly based on the third price for the second advertisement, a third score for the second advertisement, with the third score having an increased value relative to the second score; and selecting, at least partly based on the second score and the third score, the second advertisement for display in the second time zone, with the second advertisement being different from the first advertisement.

11. A non-transitory computer-readable storage medium configured to store instructions that when executed by one or more processing devices perform operations comprising:

receiving a request and information indicative of a local time in a time zone from which the request was sent;

accessing, in response to the request, a first mapping of (i) one or more first time ranges, to (ii) one or more prices to be paid for display of an advertisement;

determining, from the one or more first time ranges in the first mapping, a particular first time range that comprises the local time;

identifying, from the one or more prices in the first mapping, a particular price that is mapped to the particular first time range;

accessing a second mapping of (i) one or more second time ranges, to (ii) one or more estimated performance metrics for the advertisement;

determining, from the one or more second time ranges in the second mapping, a particular second time range that comprises the local time;

identifying, from the one or more estimated performance metrics in the second mapping, a particular estimated performance metric that is mapped to the particular second time range; and determining, at least partly based on the particular price and the particular estimated performance metric, a score for the advertisement.

12. The non-transitory computer-readable storage medium of claim 11, wherein the local time comprises at least one of (a) at least one local time-of-day, (b) at least one local time-of-day range, (c) at least one local date, (d) at least one local day-of-week, (e) at least one local date range, (f) at least one local day-of-week range, and (g) at least one local season.

13. The non-transitory computer-readable storage medium of claim 11, wherein the score comprises a numerical value.

14. The non-transitory computer-readable storage medium of claim 11, wherein the request is sent from a system that is external to the one or more processing devices; and wherein the time zone comprises a time zone of the system.

15. The non-transitory computer-readable storage medium of claim 11, wherein:

the local time comprises a first local time;
the time zone comprises a first time zone;
the request comprises a first request;
the particular price comprises a first particular price;
the score comprises a first score;
the advertisement comprises a first advertisement; and
wherein the operations further comprise:
receiving a second request and information indicative of a second local time in a second time zone from which the second request was sent, wherein the first time zone differs from the second time zone, and wherein the first local time and the second local time comprise a same time when the second local time is converted to a time in the first time zone;

determining, from the one or more first time ranges in the first mapping, a third particular time range that comprises the second local time;

identifying, from the one or more prices in the first mapping, a second particular price that is mapped to the third particular time range;
determining, at least partly based on the second particular price for the first advertisement, a second score for the first advertisement;
identifying, in a third mapping based on the second local time, a third price for a second advertisement;
determining, at least partly based on the third price for the second advertisement, a third score for the second advertisement, with the third score having an increased value relative to the second score; and
selecting, at least partly based on the second score and the third score, the second advertisement for display in the second time zone, with the second advertisement being different from the first advertisement.

* * * * *

UNITED STATES PATENT AND TRADEMARK OFFICE
CERTIFICATE OF CORRECTION

PATENT NO. : 8,560,493 B2
APPLICATION NO. : 10/676369
DATED : October 15, 2013
INVENTOR(S) : Sumit Agarwal et al.

It is certified that error appears in the above-identified patent and that said Letters Patent is hereby corrected as shown below:

In the Claims

In Claim 5, column 18, line 35:
after "advertisement;" insert -- and --.

In Claim 6, column 19, line 18:
after "time" insert -- ; --.

In Claim 10, column 19, line 44:
after "advertisement;" insert -- and --.

In Claim 10, column 19, line 62:
after "a" delete "second".

Signed and Sealed this
Eighteenth Day of March, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,560,493 B2 | Page 1 of 1 |
| APPLICATION NO. | : 10/676369 | |
| DATED | : October 15, 2013 | |
| INVENTOR(S) | : Agarwal et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1370 days.

Signed and Sealed this
Twenty-first Day of April, 2015

Michelle K. Lee
*Director of the United States Patent and Trademark Office*